Sept. 30, 1952     T. KASKOURAS     2,611,950
CAN PUNCH
Filed April 9, 1951
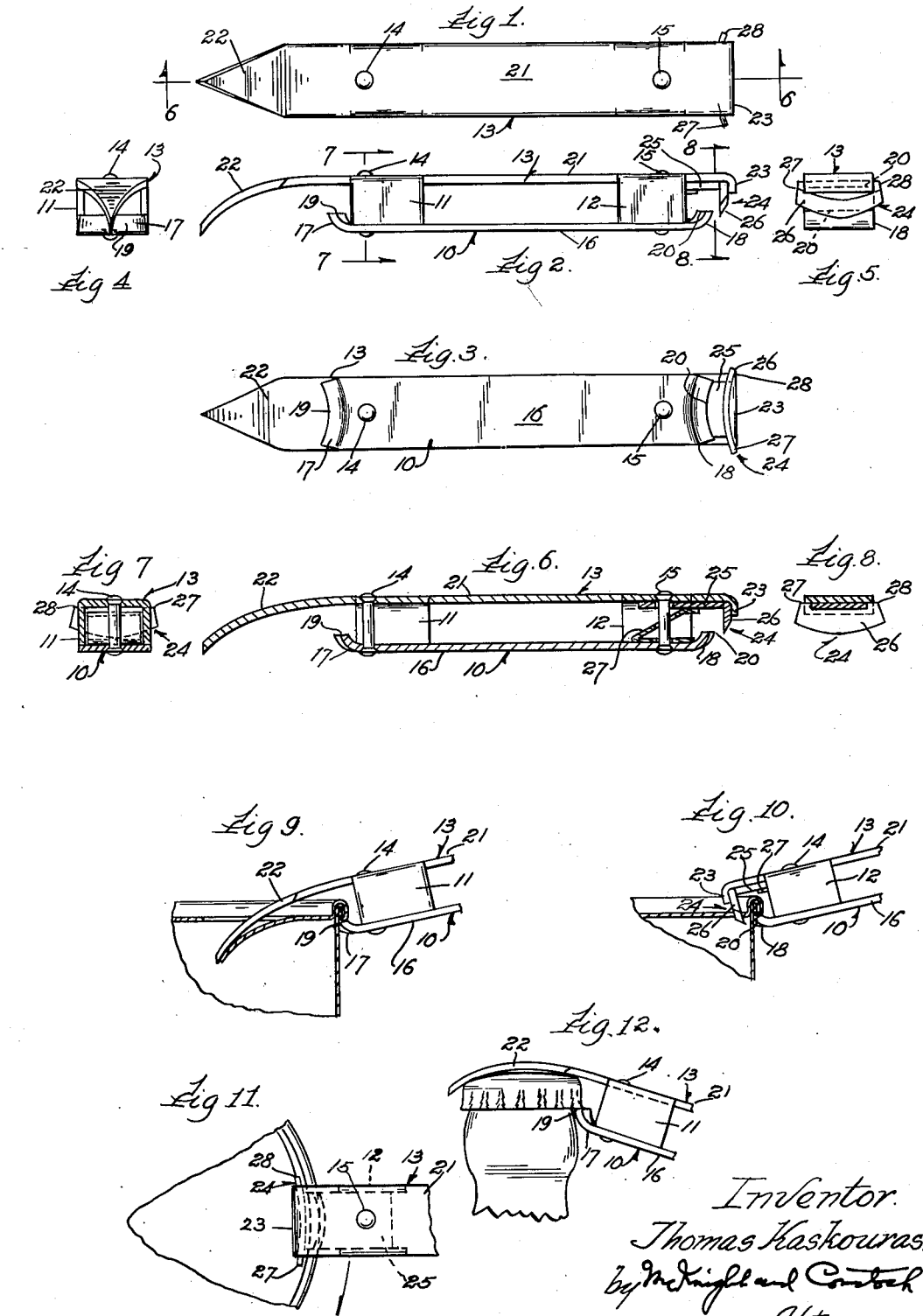

Patented Sept. 30, 1952

2,611,950

UNITED STATES PATENT OFFICE 2,611,950

CAN PUNCH

Thomas Kaskouras, Chicago, Ill.

Application April 9, 1951, Serial No. 219,939

1 Claim. (Cl. 30—16)

My invention relates to an opener for cans and bottles which will remove the top of a bottle, pierce the top of a can to provide an opening therein or remove the top of a can by piercing its entire circumference.

It is among the objects of my invention to provide a can and bottle opener which is capable of performing three different functions in the opening of cans and bottles. My device may be used to open a bottle which has been sealed with a cap in the conventional manner, such as a soft drink bottle. When so used, my opener does not damage the cap in any way and the cap may be replaced on the bottle to provide a seal which will preserve the remaining contents of the bottle.

My device may also be used to provide one or more openings in the top of a can for the purpose of removing the contents. This is customarily done with beer cans or cans containing liquids.

My device may also be used to open a conventional can, such as a can containing food, by cutting a series of openings around the entire circumference of the top so that the top may be removed. When so used my opener may be operated in either direction to accommodate right or left handed persons. When cutting the edge of the top of the can, my device crimps the inside cut portions against the inner side edge of the can so that no rough edges protrude.

My invention also contemplates such other objects, advantages and capabilities as will later more fully appear and which are inherently possessed by my invention.

While I have shown in the accompanying drawing a preferred embodiment of my invention, yet I wish it understood that the same is susceptible of modification and change without departing from the spirit of my invention.

Referring to the drawings, Fig. 1 is a top plan view of my device; Fig. 2 is a side elevational view; Fig. 3 is a bottom plan view; Fig. 4 is an elevational view of one end; Fig. 5 is an elevational view of the opposite end; Fig. 6 is a longitudinal sectional view taken on line 6—6 of Fig. 1; Fig. 7 is a detailed sectional view taken on line 7—7 of Fig. 2; Fig. 8 is a detailed sectional view taken on line 8—8 of Fig. 2; Fig. 9 is a detailed view of one end in use opening a beer can; Fig. 10 is a detailed view of the opposite end in use opening a food can; Fig. 11 is a top plan view of the opposite end in use opening a food can and Fig. 12 is a detailed view of one end of my device removing a bottle cap.

The embodiment selected to illustrate my invention comprises a horizontal bottom member 10. Positioned above horizontal bottom member 10 and spaced therefrom by spacing members 11 and 12 is a horizontal top member 13, which is attached to horizontal bottom member 10 by a pair of rivets 14 and 15. Both horizontal bottom member 10 and top member 13 are preferably made of steel.

Horizontal bottom member 10 has a level central portion 16 extending between spacing members 11 and 12. Extending integrally beyond said level central portion 16 are a pair of short hook portions 17 and 18, which extend outwardly and diagonally upwardly from level central portion 16. The ends of hook portions 17 and 18 are curved inwardly from their edges to form inwardly arced ends 19 and 20.

Horizontal top member 13 has a level central portion 21 which extends beyond the ends 19 and 20 of bottom member 10. One end of top member 13 extends beyond arced end 19 of bottom member 10 and is curved downwardly and pointed to form a hook 22.

In use, the level central portions 16 and 21 of my opener are used as handles to provide leverage. Arced end 19 of bottom member 10 is positioned against the lower edge of the bead or rim which extends around the top of a can of beer or other liquid. Hook 22 is positioned so that it extends over the top of the can. My opener is then pivoted on arced end 19 by an upward movement, causing hook 22 to pierce an opening in the top of the can. A second opening may be made in the same manner to facilitate the entry of air into the can and the removal of the liquid contents therefrom.

The same end of my opener may be used to remove the cap of a bottle such as one containing a soft drink. When so used, my opener is positioned so that arced end 19 of bottom member 10 is beneath the corrugated bottom edge of the bottle top and hook 22 extends across the entire bottle top.

When my opener is moved upwardly, it pivots at the point where the end of hook 22 contacts the bottle cap. Arced end 19 of bottom member 10 catches beneath the corrugated edge of the bottle cap and lifts it upwardly to remove it from the bottle. It should be noted that hook 22 does not puncture or damage the top of the bottle cap. The cap remains unharmed and may be replaced on the top of the bottle by a sharp blow to renew the sealing of the bottle.

The opposite end of my opener is used to open food cans by cutting a continuous opening around all or substantially all of the circumference of the top of the can. The end of top member 13 which is positioned above arced end 20 of bottom member 10 comprises a downwardly turned lip 23, which is positioned a short distance beyond arced end 20.

A cutting member 24 has a base portion 25 and a blade 26, which extends at a right angle to base 25. Base 25 is provided with an opening through which rivet 14 passes. The opening in base 25 is slightly larger than rivet 14, to permit some movement of cutting member 24.

Blade 26 is provided with a sharpened lower edge which is triangular in shape, so that it cuts in either direction. Blade 26 has a pair of upright members 27 and 28, which extend upwardly along the side edge of top member 13 to prevent cutting member 24 from being accidentally displaced.

A leaf spring 27 has a V-shape, with an opening adjacent each of its ends. Leaf spring 27 is positioned so that rivet 14 passes through both openings. When so positioned, leaf spring 27 is held under tension between the lower surface of base 25 of cutting member 24 and the upper surface of bottom member 10.

In use as a food can opener, my device is positioned so that arced end 20 of bottom member 10 bears against the lower edge of the bead or rim around the top of a food can and cutting member 24 is positioned above the top of the can, on the opposite side of the rim from arced end 20.

When the opposite end of my opener is moved upwardly, a pivot is formed at the place where arced end 20 contacts the bottom edge of the rim of the can. Blade 26 of cutting member 24 is pivoted downwardly to cut a triangular opening in the top of the can. My opener may then be moved rapidly in either a right or left hand direction around the top of the can to make a continuous cut around its circumference.

When my opener is pivoted and blade 26 cuts into the top of the can, an outward pressure is exerted against it by the rim of the can, causing base 25 of cutting member 24 to move downwardly against the pressure of leaf spring 27. This permits blade 26 to point directly downwardly at all times during the cutting operation. Because of the directly downward movement of blade 26, the edges of the can which are cut by blade 26 are crimped to lie flat against the inside edge of the can and no rough edges protrude into the interior of the can when the top has been removed.

A plastic, wood or metal insert may be fitted into my device between bottom member 10, top member 13 and spacing members 11 and 12 to improve the appearance or to carry advertising material.

Having thus described my invention, I claim:

An opener for cans comprising a bottom member having an upwardly extending hook portion adapted to fit beneath the rim of a can, a top member spaced from said bottom member, said top member having a downwardly extending lip, a cutting member comprising a base exending beneath said top member and a blade extending downwardly from said base adjacent said lip, and a spring positioned between the base of said cutting member and said bottom member, said spring providing upward pressure against said base, said base adapted to move downwardly against the pressure of said spring when said blade is in use, to keep said blade continually pointing directly downward toward the top of the can during the cutting operation.

THOMAS KASKOURAS.

REFERENCES CITED

The following references are of record in the file of this patent:

UNITED STATES PATENTS

| Number | Name | Date |
| --- | --- | --- |
| 2,455,496 | Kaskouras | Dec. 7, 1948 |